United States Patent
Wang et al.

(10) Patent No.: US 12,066,711 B2
(45) Date of Patent: Aug. 20, 2024

(54) BACK LIGHT UNIT STRUCTURE, DISPLAY PANEL AND DISPLAY APPARATUS

(71) Applicant: BOE Technology Group Co., Ltd., Beijing (CN)

(72) Inventors: Qian Wang, Beijing (CN); Wenqing Zhao, Beijing (CN); Qingxun Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 338 days.

(21) Appl. No.: 17/430,713

(22) PCT Filed: Feb. 2, 2021

(86) PCT No.: PCT/CN2021/074762
§ 371 (c)(1),
(2) Date: Aug. 12, 2021

(87) PCT Pub. No.: WO2021/208566
PCT Pub. Date: Oct. 21, 2021

(65) Prior Publication Data
US 2022/0308393 A1    Sep. 29, 2022

(30) Foreign Application Priority Data
Apr. 17, 2020  (CN) .......... 202010306237.8

(51) Int. Cl.
*G02F 1/1335* (2006.01)
*F21V 8/00* (2006.01)

(52) U.S. Cl.
CPC ....... *G02F 1/133553* (2013.01); *G02B 6/005* (2013.01); *G02F 1/133512* (2013.01)

(58) Field of Classification Search
CPC ......... G02F 1/133565; G02F 1/133611; G02F 1/133615
See application file for complete search history.

(56) References Cited

U.S. PATENT DOCUMENTS

2003/0210366 A1* 11/2003 Huang ............. G02F 1/133555
349/114
2008/0101088 A1   5/2008 Kim et al.
(Continued)

FOREIGN PATENT DOCUMENTS

CN   108717243 A    10/2018
CN   10-9188775  *  1/2019 ......... G02F 1/13357
(Continued)

OTHER PUBLICATIONS

International Search Report for PCT/CN2021/074762 Mailed May 8, 2021.
(Continued)

*Primary Examiner* — Lauren Nguyen
(74) *Attorney, Agent, or Firm* — Ling Wu; Stephen Yang; Ling and Yang Intellectual Property

(57) ABSTRACT

Provided are a back light unit structure, a display panel and a display apparatus. The back light unit structure includes a light source, and a first substrate and a second substrate which are opposite to each other; the first substrate includes a reflective structure; the second substrate includes a light guide plate and a light selection layer that are stacked; the light selection layer is located at a side of the light guide plate near the reflective structure, and a refractive index of the light selection layer is smaller than that of the light guide plate; the light selection layer is provided with a plurality of light acquiring holes penetrating through the light selection layer; the light source is located at an end of the light guide plate.

11 Claims, 5 Drawing Sheets

(56) References Cited

U.S. PATENT DOCUMENTS

| | | | |
|---|---|---|---|
| 2017/0322359 A1* | 11/2017 | Park | ................. G02F 1/133615 |
| 2019/0079240 A1 | 3/2019 | Hwang et al. | |
| 2019/0212486 A1 | 7/2019 | Ahn et al. | |
| 2021/0255384 A1 | 8/2021 | Mander et al. | |
| 2022/0050343 A1 | 2/2022 | Wang et al. | |

FOREIGN PATENT DOCUMENTS

| | | | | |
|---|---|---|---|---|
| CN | 109471215 A | 3/2019 | | |
| CN | 109799568 A | 5/2019 | | |
| CN | 110018592 A | 7/2019 | | |
| CN | 110098242 A | 8/2019 | | |
| CN | 110262119 A | 9/2019 | | |
| CN | 111474767 A | 7/2020 | | |
| JP | 2012-156082 A | 8/2012 | | |
| KR | 10-1031342 B1 | 4/2011 | | |
| WO | WO-2017-098718 | * | 6/2017 | ......... G02F 1/13357 |

OTHER PUBLICATIONS

The First Office Action dated May 23, 2022 for Chinese Patent Application No. 202010306237.8 and English Translation.

\* cited by examiner

BACK LIGHT UNIT STRUCTURE, DISPLAY PANEL AND DISPLAY APPARATUS

CROSS-REFERENCE TO RELATED APPLICATIONS

The present application is a U.S. National Phase Entry of International Application No. PCT/CN2021/074762 having an international filing date of Feb. 2, 2021, which claims priority of Chinese Patent Application No. 202010306237.8 entitled "Back Light Unit Structure, Display Panel and Display Apparatus" and filed to the CNIPA on Apr. 17, 2020. The above-identified applications are incorporated herein by reference in their entirety.

TECHNICAL FIELD

The present disclosure relates to, but is not limited to the field of display technology, specifically to a back light unit structure, a display panel and a display apparatus.

BACKGROUND

A back light source is a light source behind an LCD panel, a light effect of the back light source will directly affect a display effect of the LCD panel.

The back light source is usually realized by combining a side-entrance light source with a light guide plate. Specifically, light from the light source is guided in from one end of the light guide plate and propagates to the other end of the light guide plate, thus forming an area light source on the light guide plate. Since light will be emitted outwards continuously during the process of propagation in the light guide plate, light intensity at an end of the light guide plate near the light source is large, while light intensity at an end of the light guide plate away from the light source is small, that is, the back light source has a defect of uneven light intensity, which affects the display effect of the LCD panel.

SUMMARY

The following is a summary of subject matter described in detail in the present disclosure. This summary is not intended to limit the protection scope of the claims.

In a first aspect, an embodiment of the present disclosure provides a back light unit structure, which includes a light source, and a first substrate and a second substrate that are opposite to each other; the first substrate includes a reflective structure; the second substrate includes a light guide plate and a light selection layer that are stacked; the light selection layer is located at a side of the light guide plate near the reflective structure, and a refractive index of the light selection layer is smaller than that of the light guide plate; the light selection layer is provided with a plurality of light acquiring holes penetrating through the light selection layer; the light source is located at an end of the light guide plate.

In a second aspect, an embodiment of the present disclosure provides a display panel, which includes any back light unit structure according to the first aspect mentioned above.

In a third aspect, an embodiment of the present disclosure provides a display apparatus, which includes any back light unit structure according to the first aspect mentioned above.

In a fourth aspect, an embodiment of the present disclosure provides a display apparatus, which includes the display panel according to the second aspect mentioned above.

Additional aspects and advantages of the present disclosure will be set forth in part in the following description, and will be apparent from the description, or may be learned through practice of the present disclosure.

BRIEF DESCRIPTION OF DRAWINGS

The above and/or additional aspects and advantages of the present disclosure will become apparent and easily understood from the following description of embodiments with reference to the accompanying drawings.

DETAILED DESCRIPTION

Figure 1:
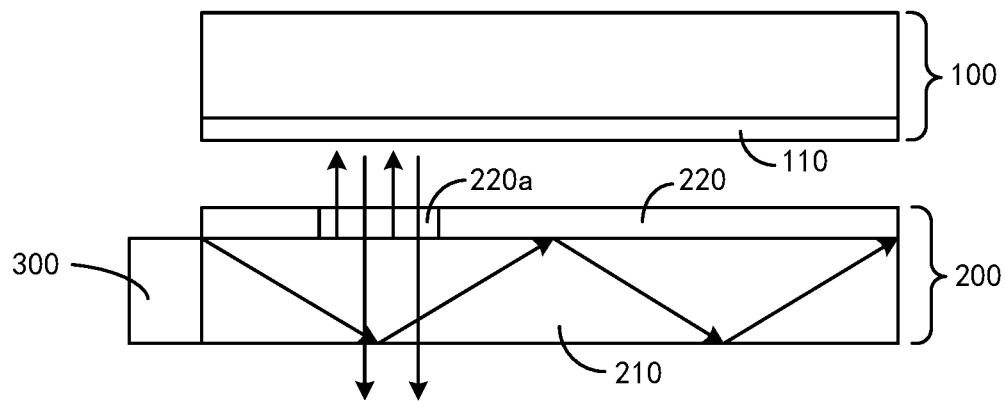
FIG. 1 is a schematic diagram of a structure of Implementation one of a back light unit structure according to an embodiment of the present disclosure.

The present disclosure is described in detail below, and examples of embodiments of the present disclosure are illustrated in the drawings, in which the same or similar reference signs always denote the same or similar components or components having the same or similar functions. In addition, if detailed description for known arts is unnecessary for illustrated features of the present disclosure, such detailed description is omitted. The embodiments described below with reference to the drawings are exemplary, and are merely intended to explain the present disclosure, and may not be interpreted as limiting the present disclosure.

It may be understood by those skilled in the art that unless otherwise defined, all terms (including technical terms and scientific terms) used herein have the same meanings as those generally understood by those skilled in the art to which the present disclosure pertains. It should also be understood that terms such as those defined in a general dictionary should be construed to have meanings consistent with those in the context of the prior arts, and will not be interpreted in idealized or overly formal meanings unless specifically defined herein.

It may be understood by those skilled in the art, the singular forms "a", "an", "said" and "the" used herein may also include plural forms unless expressly stated. It should be further understood that the phase "including" used in the specification of the present disclosure means the presence of stated features, integers, acts, operations, elements and/or components, but does not exclude the presence or addition of one or more other features, integers, acts, operations, elements, components and/or groups thereof. It should be understood that when stating that an element is "connected" or "coupled" to another element, such element may be directly connected or coupled to other elements, or there may be intermediate elements. In addition, "connected" or "coupled" used herein may include wireless connection or wireless coupling. The phrase "and/or" as used herein includes all or any unit of and all combinations of one or more associated items listed herein.

The inventors of the present disclosure have found through research that the back light source is usually realized by combining a side-entrance light source with a light guide plate, specifically, light from the light source is guided in from an end of the light guide plate and propagates to the other end of the light guide plate, thereby forming an area light source on the light guide plate. Since light will be emitted outwards continuously during the process of propagation in the light guide plate, light intensity at an end of the light guide plate near the light source is large, while light intensity at an end of the light guide plate away from the light source is small, that is, the side-entrance back light source has a defect of uneven light intensity, which affects the display effect of the LCD panel.

The technical solutions of the present disclosure are described below in detail with specific embodiments.

An embodiment of the present disclosure provides a back light unit structure. A schematic diagram of a structure of the back light unit structure is shown in FIG. 1 and includes a light source 300, and a first substrate 100 and a second substrate 200 that are opposite to each other.

The first substrate 100 includes a reflective structure 110.

The second substrate 200 includes a light guide plate 210 and a light selection layer 220 that are stacked.

The light selection layer 220 is located at a side of the light guide plate 210 near the reflective structure 110, and a refractive index of the light selection layer 220 is smaller than that of the light guide plate 210; the light selection layer 220 is provided with a plurality of light acquiring holes 220a penetrating through the light selection layer 220.

The light source 300 is located at an end of the light guide plate 210.

In this exemplary embodiment, the light source 300 is located at an end of the light guide plate 210, thereby a side-entrance light source 300 structure is formed. A combination of the side-entrance light source 300 and the light guide plate 210 realizes an area light source 300 with a uniform light intensity.

According to a principle of total internal reflection, when light enters a medium with a lower refractive index from a medium with a higher refractive index, if an incident angle is larger than a critical angle θc (the light is far from the normal), a refracted light will disappear and all the incident light will be reflected instead of entering the medium with the lower refractive index. Wherein the critical angle is an incident angle with a refraction angle of 90°.

Therefore, in the second substrate 200, a side of the light guide plate 210 is provided with a light selection layer 220 with a refractive index smaller than that of the light guide plate 210, which is beneficial to total reflection of light during the propagation from one end to the other end of the light guide plate 210, thereby reducing unnecessary light escaping from the light guide plate 210, and enhancing a light lock effect of the light guide plate 210. The light acquiring holes 220a penetrating through the light selection layer 220 may acquire light from the light guide plate 210, and each light acquiring hole 220a only acquires part of the light as required. Under a lock action of the light selection layer 220, the rest of the light is totally reflected in the light selection layer 220 and continues to propagate to an end away from the light source 300, so that a uniform light intensity of a back light source may be realized.

The reflective structure 110 in the first substrate 100 reflects the light acquired from each light acquiring hole 220a and passes through the light guide plate 210 at a small incident angle, so that an area light source 300 with a uniform light intensity may be formed.

In an exemplary implementation, personalized back lights may be provided through different layout designs of the light acquiring holes 220a. For example, various light acquiring holes 220a may be combined to form a pattern to provide a patterned back light. For another example, if the number of light acquiring holes 220a near the light source 300 is small and the number of light acquiring holes 220a away from the light source 300 is large, a back light effect that a light intensity of the light guide plate 210 near the light source 300 is small while a light intensity (of the light guide plate 210) away from the light source 300 is large may be realized.

In an exemplary implementation, a low refractive index material layer with a refractive index lower than that of the light guide plate 210 may also be stacked at a side of the light guide plate 210 away from the reflective structure 110, so that a light lock effect of the light guide plate 210 can be improved. For example, the low refractive index material layer is not provided with the light acquiring holes 220a, and light emitted by the back light unit structure is mainly provided by the light acquired from the light acquiring holes 220a of the light selection layer 220 and reflected by the reflective structure 110, and then sequentially passing through the light selection layer 220, the light guide plate 210 and the low refractive index material layer at a small incident angle. For another example, the low refractive index material layer is also provided with light acquiring holes 220a. In this case, there are two kinds of light emitted by the back light unit structure: one kind of light is light acquired from the light guide plate 210 through the light acquiring holes 220a of the low refractive index material layer, and the other is light acquired from the light acquiring holes 220a of the light selection layer 220, reflected by the reflective structure 110, and then sequentially passing through the light selection layer 220, the light guide plate 210 and the low refractive index material layer at a small incident angle.

The inventors of the present disclosure consider that when the light selection layer 220 is manufactured at a side of the light guide plate 210, a phenomenon of nanoparticle agglomeration may appear in the light selection layer 220, which may cause uneven texture of the formed light selection layer 220, resulting in light leakage and affecting a light lock effect of the light selection layer 220. Therefore, this disclosure provides the following exemplary implementation for the back light unit structure.

Figure 2:
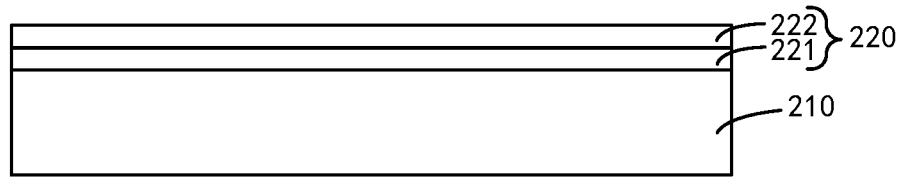
FIG. 2 is a schematic diagram of a structure of a light guide plate and a light selection layer in a second substrate of a back light unit structure according to an embodiment of the present disclosure.

As shown in FIG. 2, the light selection layer 220 of the embodiment of the present disclosure includes at least two stacked refractive layers. In any two adjacent refractive layers, a refractive index of a refractive layer away from the light guide plate 210 is smaller than that of a refractive layer near the light guide plate 210. The light acquiring holes 220a penetrate through at least two refractive layers.

In this exemplary embodiment, the light selection layer 220 includes at least two stacked refractive layers, which can effectively reduce the probability of light leakage caused by the possible phenomenon of nanoparticle agglomeration in a single refractive layer. In addition, in any two refractive layers, the refractive index of the refractive layer away from the light guide plate 210 is smaller than that of the refractive layer near the light guide plate 210, so that the total reflection of light may be facilitated between any two refractive layers, which is beneficial to capturing light escaping from the refractive layer near the light guide plate 210 and recycling it into the light guide plate 210, further enhancing a light lock effect of the light guide plate 210.

Figure 10:
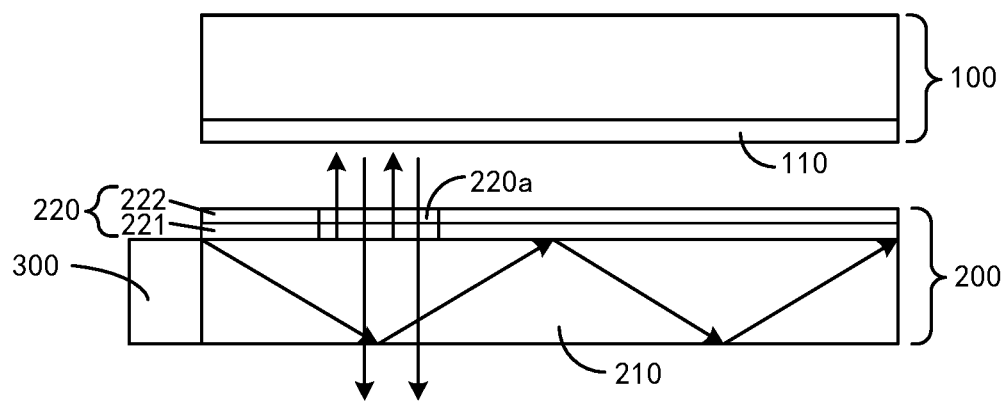
FIG. 10 is a schematic diagram of a structure of light acquiring holes and refractive layers according to an embodiment of the present disclosure.

FIG. 10 is a schematic diagram of a structure of light acquiring holes and refractive layers according to an embodiment of the present disclosure. As shown in FIG. 10, the light acquiring hole 220a penetrates through at least two refractive layers, i.e., a first refractive layer 221 and a second refractive layer 222, and is used for acquiring part of light as required.

In some exemplary implementations, a refractive index difference between any two adjacent refractive layers is not less than 0.2, and a refractive index difference between any refractive layer and the light guide plate 210 is not less than 0.2.

In some exemplary implementations, any two adjacent refractive layers include the first refractive layer 221 and the second refractive layer 222. As shown in FIG. 2, the first refractive layer 221 is located at a side of the light guide plate 210, and the second refractive layer 222 is located at a side of the first refractive layer 221 away from the light guide plate 210.

In an exemplary implementation, a refractive index of the light guide plate 210 is not less than 1.5 and not more than 1.6, a refractive index of the first refractive layer 221 is not less than 1.4 and not more than 1.5, and a refractive index of the second refractive layer 222 is not less than 1.25 and not more than 1.4. For example, the light guide plate 210 is made of glass and has a refractive index of 1.5. The light selection layer 220 adopts a mixture of organic and inorganic materials to provide different refractive indexes.

The side-entrance light source 300 is at an end of the glass light guide plate 210 to provide a collimated side-entrance light source 300. An incident angle of light entering the light guide plate 210 at an interface between the light guide plate 210 and the first refractive layer 221 may be 63°~80°. Since the incident light has a spectral energy distribution, a 1.4&1.5 interface can lock light with an incident angle greater than 70°, and light with the rest incident angles enters the 1.4&1.25 interface. Since a total reflection angle of 1.4&1.25 interface is 63°, light with an incident angle greater than 63° may continue to be locked by a 1.25 low reflective index material layer. Therefore, a light lock effect can be effectively improved, light efficiency can be promoted, and an influence of light leakage on CR (Contrast ratio) can be reduced.

The inventor of this disclosure consider that a size of an included angle between an axial direction of the light acquiring hole 220a of the light selection layer 220 and a plane where the light guide plate 210 is located will affect a divergence angle of the light acquired from the light guide plate 210. If the divergence angle is too large, a spectral width will increase, resulting in a decrease in CR and a decrease in light efficiency. Therefore, this disclosure provides the following exemplary implementation for the back light unit structure.

Figure 3:
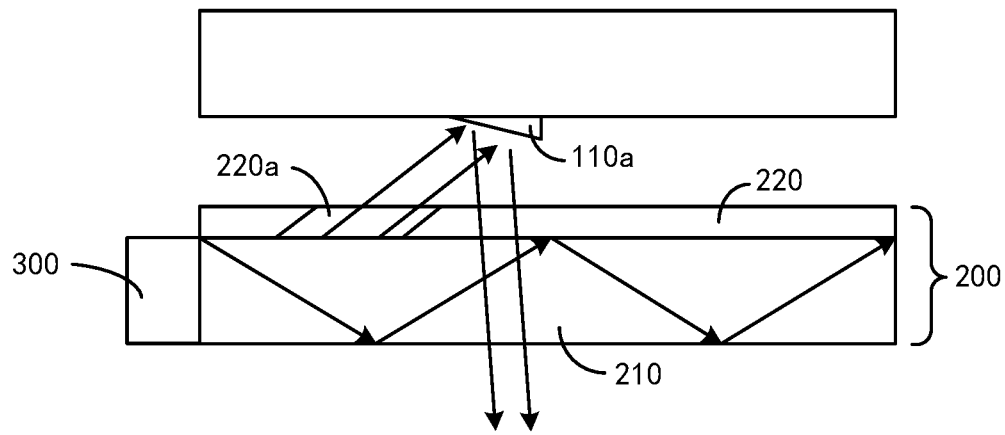
FIG. 3 is a schematic diagram of a structure of Implementation two of a back light unit structure according to an embodiment of the present disclosure.

As shown in FIG. 3, an included angle between a central axis of any light acquiring hole 220a of the light selection layer 220 and a plane where the light guide plate 210 is located is an acute angle.

In this exemplary embodiment, the included angle between the central axis of the light acquiring hole 220a and the plane where the light guide plate 210 is located is an acute angle (i.e., non-vertical), which is more adaptive with an angle at which the light from the side-entrance light source 300 enters the light guide plate 210, thus reducing disorder scattering of the acquired light caused by a hole wall of the light acquiring hole 220a, and further reducing light intensity loss.

In an exemplary implementation, the light acquiring hole 220a of which the central axis has an acute angle with the plane where the light guide plate 210 is located may be made by an ICP (Inductively Coupled Plasma) etching process, and the light acquiring hole 220a of which the central axis has an acute angle with the plane where the light guide plate 210 is located may be etched on the light selection layer 220 by controlling different OE (over etch) amounts. The ICP etching is an inductively coupled plasma etching.

The inventors of the present disclosure consider that the collimated light source 300 has a certain divergence angle in theory, which will reduce light efficiency of collimated light, and hole wall morphology of the light acquiring hole 220a of the light selection layer 220 may also affect a divergence angle of the light acquired from the light guide plate 210, and further affect a spectral width, light efficiency, etc. Therefore, this disclosure provides the following exemplary implementation for the back light unit structure.

Figure 4:
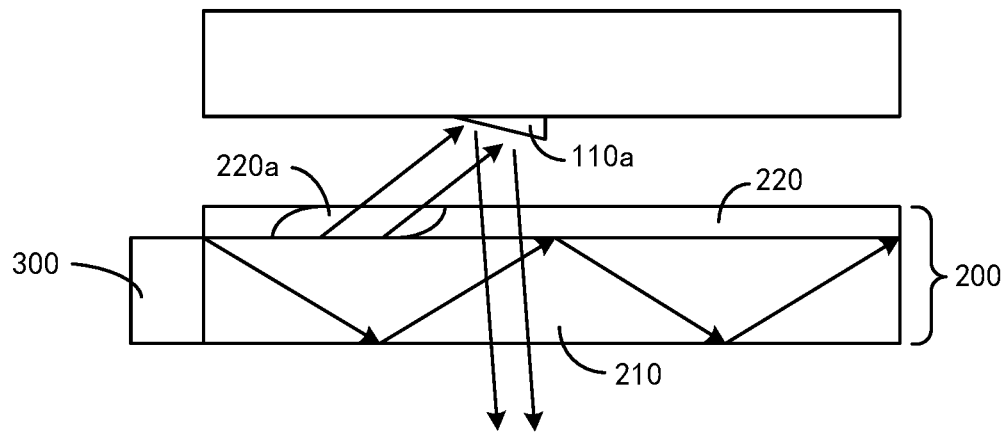
FIG. 4 is a schematic diagram of a structure of Implementation three of a back light unit structure according to an embodiment of the present disclosure.

As shown in FIG. 4, in a refractive layer of an embodiment of the present disclosure, an intersection line between the hole wall of the light acquiring hole 220a and a plane including the central axis of the light acquiring hole 220a is a curve, and an opening of the curve faces the central axis of the light acquiring hole 220a.

In this exemplary embodiment, an intersection line between the hole wall of the light acquiring hole 220a and the plane where the central axis of the light acquiring hole 220a is located is a curve, and an opening of the curve faces the central axis of the light acquiring hole 220a. The hole wall of the light acquiring hole 220a may play a role in converging a divergent light of the collimated light acquired from the light acquiring hole 220a, that is, a divergence angle of the acquired light can be reduced, a spectral width can be reduced, and light efficiency can be improved to obtain higher light transmittance.

In some exemplary implementations, the curve is a gradient parabola. The hole wall of the light acquiring hole 220a adopts a gradient parabola design, which can reflect a divergent light with a large angle and reduce a divergent angle of the acquired light.

In an exemplary implementation, an included angle between an equivalent reflective plane at any position on the hole wall and the plane where the light guide plate 210 is located is a difference between an included angle between the central axis of the light acquiring hole 220a and the plane where the light guide plate 210 is located and half of a divergence angle of divergent light corresponding to any position on the hole wall.

The equivalent reflective plane refers to a reflective plane with a same reflection property as a reflection position of the hole wall.

Taking the plane where the light guide plate 210 is located as a reference plane, the central axis of the light acquiring hole 220a is regarded as a center line of the light acquired from the light acquiring hole 220a. Theoretically, the collimated light source 300 may reach a divergence angle of ±5°, and an acquired light with a central angle of 70° may generate light of 65°-75°. The hole wall of the light acquiring hole 220a is designed as a reflective hole wall which is a reflective hole wall of 67.5° corresponding to acquired light of 65° and a reflective hole wall of 72.5° corresponding to a acquired light of 75°. When the 65° acquired light and the 75° acquired light enter the light acquiring hole 220a, they will be reflected to be light of 70°, which is the same as the central angle, by the hole wall of the light acquiring hole 220a, thereby convergence of light beams is realized.

The inventors of the present disclosure consider that in the aforementioned embodiments, the light selection layer 220 of the second substrate 200 adopts a light acquiring structure in which the included angle of the central axis of the light acquiring hole 220a and the plane where the light guide plate 210 is located is an acute angle, and the refractive index of the light selection layer 220 in the second substrate 200 is smaller than that of the light guide plate 210, so the acquired light reaching the reflective structure 110 of the first substrate 100 may have an excessively large incident angle. That is, the reflection angle when the acquired light leaves the reflective structure 110 will be large, which will affect a light emitting direction after the acquired light re-passes through the light guide plate 210, thereby cause a large light emitting deflection (that is, a position where the acquired light re-passes through the light guide plate 210 is excessively far away from a position of the light acquiring hole 220a). Therefore, this disclosure provides the following exemplary implementation for the back light unit structure.

Figure 5:
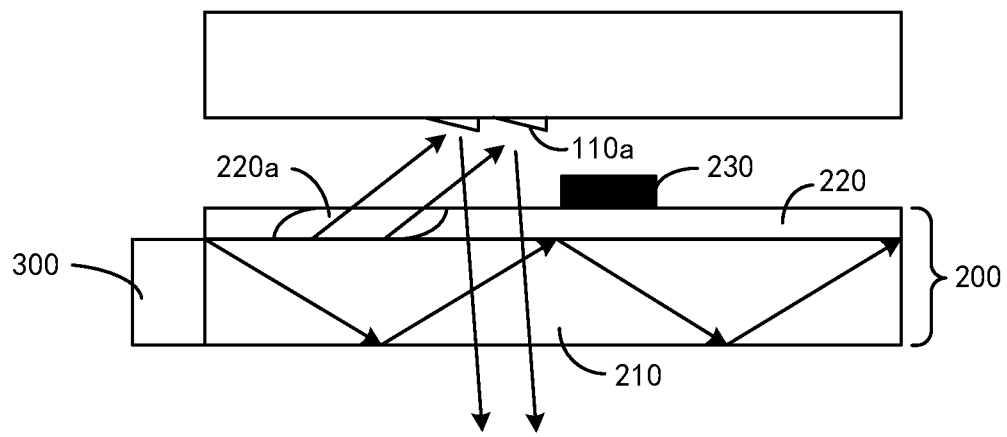
FIG. 5 is a schematic diagram of a structure of Implementation four of a back light unit structure according to an embodiment of the present disclosure.

As shown in FIG. 5, the reflective structure 110 of an embodiment of the present disclosure includes a plurality of reflectors 110a, and an included angle between a reflective plane of the reflector 110a and a plane where the light guide plate 210 is located is an acute angle.

In some exemplary implementations, the plurality of reflectors 110a and a plurality of light acquiring holes 220a are in a one-to-one correspondence.

In this exemplary embodiment, the reflective structure 110 includes a plurality of reflectors 110a for reflecting acquired light, so that the acquired light is emitted from the other side of the light guide plate 210 to provide back light. An included angle between a reflective plane of the reflector 110a and the plane where the light guide plate 210 is located is an acute angle, so as to correct an excessive incident angle when the acquired light reaches the reflective structure 110 of the second substrate 200, which is beneficial to emitting the acquired light in a direction perpendicular to or nearly perpendicular to the plane where the light guide plate 210 is located after reflection, thereby effectively correcting the light emitting direction after the acquired light re-passes through the light guide plate 210, and reducing the light emitting deflection.

In the reflective structure 110, a plurality of reflectors 110a and a plurality of light acquiring holes 220a are in a one-to-one correspondence, that is, each reflector 110a reflects light acquired from one light acquiring hole 220a, and reflectors 110a may not be made in other parts of the reflective structure 110 that do not correspond to the light acquiring holes 220a, which may effectively reduce the cost.

In some exemplary implementations, at least two reflectors 110a correspond to one light acquiring hole 220a.

In this exemplary embodiment, at least two reflectors 110a are used for reflecting light acquired from one light acquiring hole 220a, that is, a sum of all reflective planes of a plurality of reflectors 110a may be equivalent to a reflective plane corresponding to one light acquiring hole 220a. In this way, a size of the reflector 110a can be reduced without reducing a reflection area, especially a height of the single reflector 110a can be greatly reduced, that is, a thickness of the reflective structure 110 can be reduced, thereby reducing a thickness of the back light unit structure.

Figure 6:
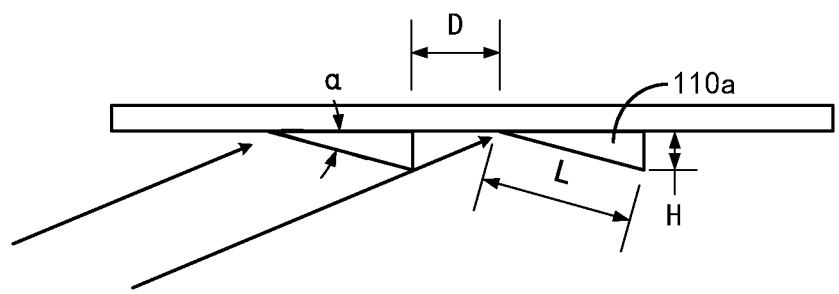
FIG. 6 is a schematic diagram of a structure of a reflector in a reflective structure of a back light unit structure according to an embodiment of the present disclosure.

In an exemplary implementation, as shown in FIG. 6, the reflector 110a is wedge-shaped, so that an included angle between a reflective plane of the reflector 110a and a plane where the light guide plate 210 is located is an acute angle. When at least two reflectors 110a correspond to one light acquiring hole 220a, an included angle between a central axis of any light acquiring hole 220a of the light selection layer 220 and a plane where the light guide plate 210 is located is [67°, 73°]; an included angle between a reflective plane of any reflector 110a and the plane where the light guide plate 210 is located is $\alpha$=[31°, 33°]; a height of any reflector 110a is H=[1.524 μm, 1.862 μm]; a length of the reflective plane of any reflector 110a is L=[2.876 μm, 3.515 μm]; and a distance between two adjacent reflectors 110a in a length direction of the reflective plane of the reflector 110a is D=[4.190 μm, 5.122 μm].

In an exemplary implementation, the reflector 110a may adopt a metal prism.

The inventors of the present disclosure consider that the light reflected by the reflective structure 110 may possibly be scattered to some extent due to affections of, for example, a reflective plane of the reflective structure 110 or a divergence angle of the light itself, and a small amount of unnecessary scattered light directly emitted through the light guide plate 210 may affect a back light effect. Therefore, this disclosure provides the following exemplary implementation for the back light unit structure.

As shown in FIG. 5, the second substrate 200 of an embodiment of the present disclosure further includes a first black matrix 230.

The first black matrix 230 is located at a side of the light selection layer 220 near the reflective structure 110, and the first black matrix 230 corresponds to a plurality of reflectors 110a.

In this exemplary embodiment, the first black matrix 230 corresponds to a plurality of reflectors 110a, specifically, a small amount of unnecessary scattered light in light reflected by the reflective structure 110 is shielded by the first black matrix 230, so as to ensure an effect of back light composed of the light emitted from the light guide plate 210.

In an exemplary implementation, a planarization layer 250 is disposed in a gap of the first black matrix 230, or in a gap of the first black matrix 230 and one side of the first black matrix 230 near a second conductive layer 240, which may planarize a film layer and facilitate the manufacture of other film layers such as the second conductive layer 240. It may be understood that the planarization layer 250 may also be disposed on a side of the second conductive layer 240 away from a liquid crystal layer 400 to provide an insulation function.

The inventors of this disclosure consider that if a gray tone of a back light source may be adjustable, light efficiency of the back light source may be enriched. Therefore, this disclosure provides the following exemplary implementation for the back light unit structure.

Figure 7:
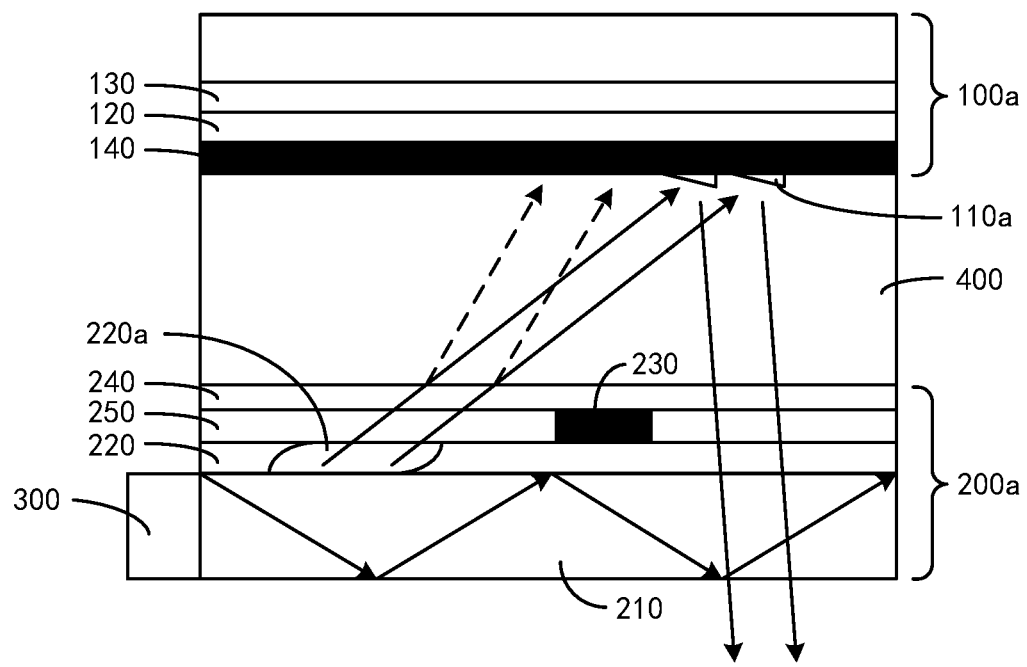
FIG. 7 is a schematic diagram of a structure of Implementation five of a back light unit structure according to an embodiment of the present disclosure.

As shown in FIG. 7, according to the embodiment of the present disclosure the first substrate 100 is a first liquid crystal cell substrate 100a, the second substrate 200 is a second liquid crystal cell substrate 200a, and the back light unit structure further includes a liquid crystal layer 400.

The first liquid crystal cell substrate 100a further includes a first conductive layer 120 and a control device layer 130; the first conductive layer 120 is located at a side of the reflective structure 110 away from the light guide plate 210; the control device layer 130 is located at a side of the first conductive layer 120 away from the reflective structure 110.

The second liquid crystal cell substrate 200a further includes a second conductive layer 240; wherein the second conductive layer 240 is located at a side of the light selection layer 220 away from the light guide plate 210.

The liquid crystal layer 400 is located between the reflective structure 110 and the second conductive layer 240.

In this exemplary embodiment, a liquid crystal layer 400 is disposed between the first liquid crystal cell substrate 100a and the second liquid crystal cell substrate 200a. Specifically, the liquid crystal layer 400 is disposed between the reflective structure 110 of the first liquid crystal cell substrate 100a and the light selection layer 220 of the second liquid crystal cell substrate 200a. The control device layer 130 of the first liquid crystal cell substrate 100a changes states of liquid crystals in the liquid crystal layer 400 by controlling different voltages of the first conductive layer 120 and the second conductive layer 240 on both sides of the liquid crystal layer 400, so that light acquired from the light acquiring hole 220a of the light selection layer 220 and passing through the liquid crystal layer 400 may be deflected, and then the light passing through the liquid crystal layer 400 may be linearly changed between the "fully aligning with the reflective structure 110" (i.e., the back light is the brightest) and "completely removed from the reflective structure 110" (i.e., the back light is the darkest), so that it can be realized that a gray tone of the back light is adjustable.

The inventors of the present disclosure consider that there is partial component light in the light without polarization processing, which may affect accuracy of the gray tone adjustment. For example, when the light passing through the liquid crystal layer 400 is deflected to a state of "completely removed from the reflective structure 110" by controlling changes of the liquid crystal state, the component light may at least partially align with the reflective structure 110, which may lead to light leakage. In order to avoid light leakage caused by partial component light, polarizers are usually added on a light entrance end surface of the light guide plate 210 of the side-entrance back light source 300 structure (i.e., between the side-entrance light source 300 and the light guide plate 210) to filter out unnecessary partial component light, however, which will lead to a decrease in light intensity entering the light guide plate 210, thereby greatly reducing a light utilization rate of the light source 300. Therefore, this disclosure provides the following exemplary implementation for the back light unit structure.

Figure 8:
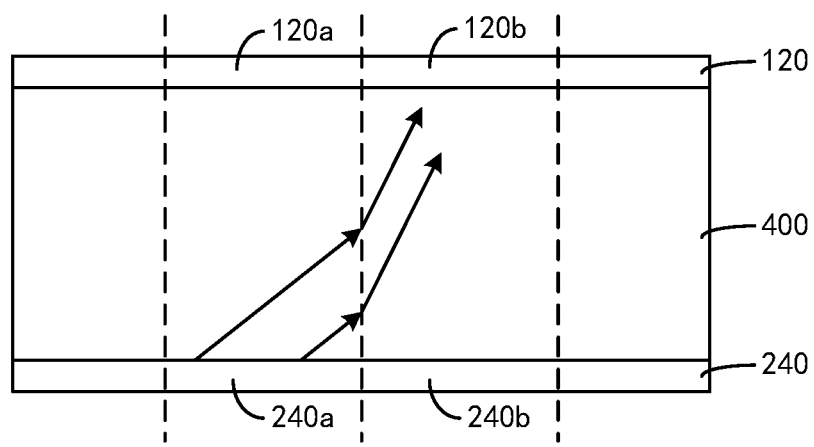
FIG. 8 is a schematic diagram of a structure of a liquid crystal layer 400, and a first conductive layer 120 and a second conductive layer 240 on both sides of the liquid crystal layer 400 in a back light unit structure and an optical path of acquired light in the liquid crystal layer 400 according to an embodiment of the present disclosure.
Figure 9:
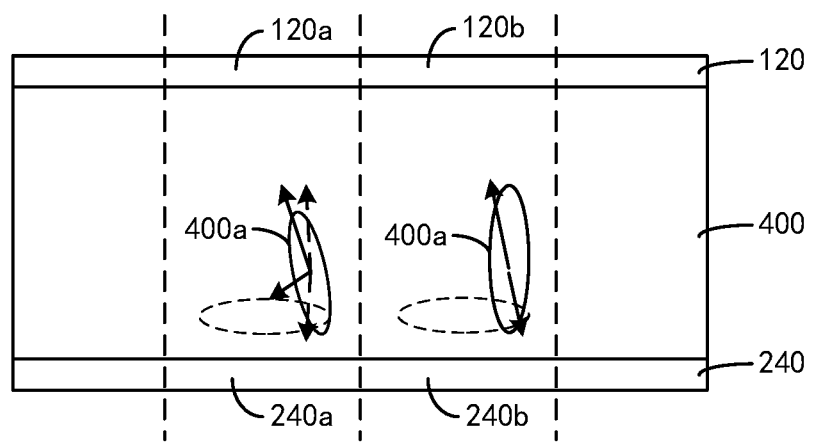
FIG. 9 is a schematic diagram of a structure of a liquid crystal layer 400, and a first conductive layer 120 and a second conductive layer 240 on both sides of the liquid crystal layer 400 in a back light unit structure, and states of liquid crystal particles 400a in the liquid crystal layer 400.

As shown in FIGS. 8 and 9, a central axis of the liquid crystal particles 400a in the liquid crystal layer 400 is parallel to a projection of a central axis of the light acquiring hole 220a on a plane where the light guide plate 210 is located according to an embodiment of the present disclosure.

The first conductive layer 120 includes a first rotation control part 120a and a first deflection control part 120b in sequence along a projection direction of a direction from the light acquiring hole 220a pointing to the reflective structure 110 on the first conductive layer 120.

The second conductive layer 240 includes a second rotation control part 240a and a second deflection control part 240b in sequence along a projection direction of a direction from the light acquiring hole 220a pointing to the reflective structure 110 on the second conductive layer 240.

The first rotation control part 120a and the second rotation control part 240a are in a one-to-one correspondence, and the first deflection control part 120b and the second deflection control part 240b are in a one-to-one correspondence.

In order to concisely illustrate a principle of the present embodiment, only the liquid crystal layer 400 and the first conductive layer 120 and the second conductive layer 240 on both sides of the liquid crystal layer 400 are illustrated in FIGS. 8 and 9, and other film structures are omitted.

In this exemplary embodiment, since an included angle between a central axis of the light acquiring hole 220a in the light selection layer 220 and a plane where the light guide plate 210 is located is an acute angle, that is, an optical path of the acquired light entering the liquid crystal layer 400 is oblique, the first conductive layer 120 and the second conductive layer 240 are divided into different control parts along projection directions of the optical paths of the acquired light on the planes where the respective conductive layers are located, so that the optical path control of different parts of the acquired light can be realized and purposes of achieving polarization rotation and deflection of the acquired light can be reached.

In an exemplary implementation, the first rotation control part 120a on the first conductive layer 120 away from the reflector 110a and the second rotation control part 240a on the second conductive layer 240 near the light acquiring hole 220a are in a one-to-one correspondence. By controlling a potential difference between the first rotation control part 120a and the second rotation control part 240a (i.e., a voltage, for example, applying a voltage of 4.5 volts), liquid crystal particles 400a in a region between the first rotation control part 120a and the second rotation control part 240a in the liquid crystal layer 400 undergo a first specified state change (for example, being upright at a certain angle), so that acquired light entering the liquid crystal layer 400 firstly realizes polarization rotation, and component light of the acquired light passing through the liquid crystal layer 400 will not be emitted on the reflective structure 110 during deflection, thus avoiding light leakage.

In an exemplary implementation, the first deflection control part 120b on the first conductive layer 120 near the reflector 110a and the second deflection control part 240b on the second conductive layer 240 away from the light acquiring hole 220a are in a one-to-one correspondence. By controlling a potential difference between the first deflection control part 120b and the second deflection control part 240b (i.e., a voltage, for example applying a voltage of 5.0 volts), liquid crystal particles 400a in a region between the first deflection control part 120b and the second deflection control part 240b in the liquid crystal layer 400 undergo a second specified state change (for example, completely upright), so that acquired light entering the liquid crystal layer 400 is deflected (in this case, the acquired light may fully align with the reflector 110a or be completely removed from the reflector 110a). By adjusting a potential difference between the first deflection control part 120b and the second deflection control part 240b, thus it can be realized that a gray tone of the back light of the back light unit structure is adjustable.

Therefore, in this exemplary embodiment, there is no need to add a polarizer on a light entrance end surface of the light guide plate 210 (i.e., between the side-entrance light source 300 and the light guide plate 210), and all the light from the light source 300 may be directly guided into the light guide plate 210, thereby increasing an utilization rate of the light source 300.

The inventors of the present disclosure consider that in the process of realizing the gray tone of the back light to be adjustable, the lower the reflectivity of the region other than the reflective structure 110 of the first liquid crystal cell substrate 100a to light, the higher the accuracy of the gray tone. Therefore, this disclosure provides the following exemplary implementation for the back light unit structure.

As shown in FIG. 7, the first liquid crystal cell substrate 100a of an embodiment of the present disclosure further includes a second black matrix 140.

In some exemplary implementations, the second black matrix 140 is located between the first conductive layer 120 and the reflective structure 110.

In this exemplary embodiment, the second black matrix 140 is used to fill a region rather than the reflective structure 110 of the first liquid crystal cell substrate 100a. The second black matrix 140 can prevent light removed from the reflective structure 110 from reflecting, further avoiding light leakage and ensuring the accuracy of a gray tone adjustment. The second black matrix 140 may be stacked between the first conductive layer 120 and the reflective structure 110 in a form of a whole layer.

In some exemplary implementations, the second black matrix 140 is located at a side of the first conductive layer 120 near the liquid crystal layer 400, and a plurality of reflectors 110a of the reflective structure 110 are embedded in the second black matrix 140.

Similar to the previous embodiment, in the present embodiment the second black matrix 140 is used to fill a region rather than the reflective structure 110 of the first liquid crystal cell substrate 100a. The second black matrix 140 may prevent light removed from the reflective structure 110 from reflecting, further avoiding light leakage and ensuring the accuracy of a gray tone adjustment. The difference is that the plurality of reflectors 110a of the reflective structure 110 are embedded in the second black matrix 140, which can reduce a thickness of a film.

Based on the same inventive concept, an embodiment of the present disclosure provides a display panel, including the back light unit structure according to any of the above embodiments.

In this exemplary embodiment, the display panel adopts the back light unit structure according to the previous embodiments. Please refer to the previous embodiments for their principles and technical effects, which will not be described repeatedly here.

Based on the same inventive concept, a display apparatus according to an embodiment of the present disclosure includes: the back light unit structure according to any of the above embodiments; or, the display panel according to the above embodiments.

In this exemplary embodiment, the display apparatus adopts the back light unit structure or the display panel according to the previous embodiments. Please refer to the previous embodiments for their principles and technical effects, which will not be described repeatedly here.

Embodiments of the present disclosure may be applied to at least achieve the following beneficial effects.

1. In the second substrate 200, a side of the light guide plate 210 is provided with a light selection layer 220 with a refractive index smaller than that of the light guide plate 210, which is beneficial to total reflection of light during the propagation from one end to the other end of the light guide plate 210, thereby reducing unnecessary light escaping from the light guide plate 210, and enhancing a light lock effect of the light guide plate 210. The light acquiring holes 220a penetrating through the light selection layer 220 may acquire light from the light guide plate 210, and each light acquiring hole 220a only acquires part of the light as required. Under a lock action of the light selection layer 220, the rest of the light is totally reflected in the light selection layer 220 and continues to propagate to an end away from the light source 300, so that uniform light intensity of a back light source 300 with a can be realized. The reflective structure 110 in the first substrate 100 reflects the light acquired from each light acquiring hole 220a and passes through the light guide plate 210 at a small incident angle, so that an area light source 300 with a uniform light intensity may be formed.

2. The light selection layer 220 includes at least two stacked refractive layers, which can effectively reduce the probability of light leakage caused by the possible phenomenon of nanoparticle agglomeration in a single refractive layer. In addition, in any two refractive layers, the refractive index of the refractive layer away from the light guide plate 210 is smaller than that of the refractive layer near the light guide plate 210, so that the total reflection of light may be facilitated between any two refractive layers, which is beneficial to capturing light escaping from the refractive layer near the light guide plate 210 and recycling it into the light guide plate 210, further enhancing a light lock effect of the light guide plate 210.

3. An included angle between a central axis of the light acquiring hole 220a and a plane where the light guide plate 210 is located is an acute angle (i.e., non-vertical), which is more adaptive with an angle at which the light from the side-entrance light source 300 enters the light guide plate 210, thus reducing disorder scattering of the acquired light caused by a hole wall of the light acquiring hole 220a, and thus reducing light intensity loss.

4. An intersection line between the hole wall of the light acquiring hole 220a and a plane where the central axis of the light acquiring hole 220a is located is a curve, and an opening of the curve faces the central axis of the light acquiring hole 220a. The hole wall of the light acquiring hole 220a can play a role in converging a divergent light of the collimated light acquired from the light acquiring hole 220a, that is, a divergence angle of the acquired light can be reduced, a spectral width can be reduced, light efficiency can be improved to obtain higher light transmittance.

5. The reflective structure 110 includes a plurality of reflectors 110a for reflecting acquired light, so that the acquired light is emitted from the other side of the light guide plate 210 to provide back light. An included angle between a reflective plane of the reflector 110a and the plane where the light guide plate 210 is located is an acute angle, so as to correct an excessive incident angle when the acquired light reaches the reflective structure 110 of the second substrate 200, which is beneficial to emitting the acquired light in a direction perpendicular to or nearly perpendicular to the plane where the light guide plate 210 is located after reflection, thereby effectively correcting the light emitting direction after the acquired light re-passes through the light guide plate 210, and reducing the light emitting deflection.

6. The first black matrix 230 corresponds to a plurality of reflectors 110a, specifically, a small amount of unnecessary scattered light in light reflected by the reflective structure 110 is shielded by the first black matrix 230, so as to ensure an effect of back light composed of the light emitted from the light guide plate 210.

7. A liquid crystal layer 400 is disposed between the first liquid crystal cell substrate 100a and the second liquid crystal cell substrate 200a. The control device layer 130 of the first liquid crystal cell substrate 100a changes states of liquid crystals in the liquid crystal layer 400 by controlling different voltages of the first conductive layer 120 and the second conductive layer 240 on both sides of the liquid crystal layer 400, so that light acquired from the light acquiring hole 220a of the light selection layer 220 and passing through the liquid crystal layer 400 may be deflected, and then the light passing through the liquid crystal layer 400 may be linearly changed between the "all-aligned reflective structure 110" (i.e., the back light is the brightest) and "completely removed from the reflective structure 110" (i.e., the back light is the darkest), so that it can be realized that a gray tone of the back light is adjustable.

8. Since an included angle between a central axis of the light acquiring hole 220a in the light selection layer 220 and a plane where the light guide plate 210 is located is an acute angle, that is, an optical path of the acquired light entering the liquid crystal layer 400 is oblique, the first conductive layer 120 and the second conductive layer 240 are divided into different control parts along projection directions of the optical paths of the acquired light on the planes where the respective conductive layers are located, so that the optical path control of different parts of the acquired light can be realized and purposes of achieving polarization rotation and deflection of the acquired light can be reached. The polarization rotation of the acquired light may be achieved so that component light of the acquired light will not be emitted onto the reflective structure 110, thus avoiding light leakage. Furthermore, there is no need to add a polarizer on a light entrance end surface of the light guide plate 210 (i.e., between the side-entrance light source 300 and the light guide plate 210), and light from the light source 300 may be directly guided into the light guide plate 210, thereby increasing an utilization rate of the light source 300.

9. The second black matrix 140 is used to fill a region rather than the reflective structure 110 of the first liquid crystal cell substrate 100a. The second black matrix 140 can prevent light removed from the reflective structure 110 from reflecting, further avoiding light leakage and ensuring the accuracy of a gray tone adjustment.

Those skilled in the art can understand that acts, measures and solutions in various operations, methods, and the process already discussed in the present disclosure may be alternated, changed, combined or deleted. Further, other acts, measures and solutions in various operations, methods and processes already discussed in the present disclosure may also be alternated, changed, rearranged, divided, combined or deleted. Further, acts, measures and schemes in the prior arts having the same functions with those in various operations, methods and processes disclosed in the present disclosure may also be alternated, changed, rearranged, divided, combined or deleted.

In the description of the present disclosure, it needs to be understood that, an orientation or position relationship indicated by terms "center", "upper", "lower", "front", "rear", "left", "right", "vertical", "horizontal", "top", "bottom", "inside", "outside", or the like is based on the orientation or position relationship shown in the drawings, and this is only for ease of description of the present disclosure and simplification of the description, rather than indicating or implying that the referred apparatus or element must have a specific orientation, or be constructed and operated in a particular orientation, and therefore this may not be understood as a limitation on the present disclosure.

The terms "first" and "second" are used for descriptive purposes only, and may not be understood as indicating or implying relative importance or implicitly indicating the number of technical features indicated. Thus, features defined by "first" and "second" may include one or more of the features explicitly or implicitly. In the description of the present disclosure, unless otherwise specified, "multiple" means two or more.

In the description of the present disclosure, unless otherwise clearly specified and defined, the terms "install", "connect", "couple" should be broadly interpreted, for example, it may be connected fixedly or may be connected detachably, or integrated; it may be directly connected, or may be indirectly connected through an intermediary, or may be an internal connection between two elements. For those of ordinary skills in the art, the specific meanings of the above terms in the present disclosure may be understood according to specific situations.

In the description of the present disclosure, specific characteristics, structures, materials, or features may be combined in an appropriate manner in any one or more embodiments or examples.

The above is only part of the implementations of the present disclosure, and it should be noted that for those of ordinary skill in the art, without departing from the principles of the present disclosure, several improvements and modifications may be made, and these improvements and modifications should also be regarded as covered by the protection scope of the present disclosure.

What is claimed is:

1. A back light unit structure, comprising: a light source (300); a first substrate (100) and a second substrate (200) that are opposite to each other, wherein:

the first substrate (100) comprises a reflective structure (110);

the second substrate (200) comprises a light guide plate (210) and a light selection layer (220) that are stacked;

the light selection layer (220) is located at a side of the light guide plate (210) near the reflective structure (110), and a refractive index of the light selection layer (220) is smaller than that of the light guide plate (210);

the light selection layer (220) is provided with a plurality of light acquiring holes (220a) penetrating through the light selection layer (220);

the light source (300) is located at an end of the light guide plate (210);

the light selection layer (220) comprises at least two stacked refractive layers; in any two adjacent refractive layers of the refractive layers, a refractive index of a refractive layer away from the light guide plate (210) is smaller than that of a refractive layer near the light guide plate (210);

the light acquiring holes (220a) penetrate through the at least two refractive layers;

an included angle between a central axis of any light acquiring hole (220a) of the light selection layer (220) and a plane where the light guide plate (210) is located is an acute angle;

the reflective structure (110) comprises a plurality of reflectors (110a), and an included angle between a reflective plane of the reflector (110a) and the plane where the light guide plate (210) is located is an acute angle;

the plurality of reflectors (110*a*) and the plurality of light acquiring holes (220*a*) are in a one-to-one correspondence; or, at least two reflectors (110*a*) correspond to one light acquiring hole (220*a*);

the first substrate (100) is a first liquid crystal cell substrate (100*a*), the second substrate (200) is a second liquid crystal cell substrate (200*a*), and the back light unit structure further comprises a liquid crystal layer (400);

the first liquid crystal cell substrate (100*a*) further comprises a first conductive layer (120) and a control device layer (130); wherein the first conductive layer (120) is located at a side of the reflective structure (110) away from the light guide plate (210); the control device layer (130) is located at a side of the first conductive layer (120) away from the reflective structure (110);

the second liquid crystal cell substrate (200*a*) further comprises a second conductive layer (240); wherein the second conductive layer (240) is located at a side of the light selection layer (220) away from the light guide plate (210);

the liquid crystal layer (400) is located between the reflective structure (110) and the second conductive layer (240);

a central axis of a liquid crystal particle (400*a*) in the liquid crystal layer (400) is parallel to a projection of the central axis of the light acquiring hole (220*a*) on the plane where the light guide plate (210) is located;

the first conductive layer (120) comprises a first rotation control part (120*a*) and a first deflection control part (120*b*) in sequence along a projection direction of a direction from the light acquiring hole (220*a*) pointing to the reflective structure (110) on the first conductive layer (120);

the second conductive layer (240) comprises a second rotation control part (240*a*) and a second deflection control part (240*b*) in sequence along a projection direction of a direction from the light acquiring hole (220*a*) pointing to the reflective structure (110) on the second conductive layer (240); and the first rotation control part (120*a*) and the second rotation control part (240*a*) are in a one-to-one correspondence, and the first deflection control part (120*b*) and the second deflection control part (240*b*) are in a one-to-one correspondence.

2. The back light unit structure of claim 1, wherein a refractive index difference between any two adjacent refractive layers is not less than 0.2, and a refractive index difference between any refractive layer and the light guide plate (210) is not less than 0.2.

3. The back light unit structure of claim 1, wherein the any two adjacent refractive layers comprise a first refractive layer (221) and a second refractive layer (222); the first refractive layer (221) is located at a side of the light guide plate (210), and the second refractive layer (222) is located at a side of the first refractive layer (221) away from the light guide plate (210);

a refractive index of the light guide plate (210) is not less than 1.5 and not more than 1.6, a refractive index of the first refractive layer (221) is not less than 1.4 and not more than 1.5, and a refractive index of the second refractive layer (222) is not less than 1.25 and not more than 1.4.

4. The back light unit structure of claim 1, wherein an intersection line between a hole wall of the light acquiring hole (220*a*) and a plane comprising a central axis of the light acquiring hole (220*a*) is a curve, and an opening of the curve faces the central axis of the light acquiring hole (220*a*).

5. The back light unit structure of claim 4, wherein the curve is a gradient parabola, and/or an included angle between an equivalent reflective plane at any position on the hole wall and the plane where the light guide plate (210) is located is a difference between the included angle between the central axis of the light acquiring hole (220*a*) and the plane where the light guide plate (210) is located and half of a divergence angle of divergent light corresponding to any position on the hole wall.

6. The back light unit structure of claim 1, wherein the reflector (110*a*) is wedge-shaped;

when at least two reflectors (110*a*) correspond to one light acquiring hole (220*a*), an included angle between a central axis of any light acquiring hole (220*a*) of the light selection layer (220) and the plane where the light guide plate (210) is located is [67°, 73°]; an included angle between a reflective plane of any reflector (110*a*) and the plane where the light guide plate (210) is located is [31°, 33°]; a height of any reflector (110*a*) is [1.524 µm, 1.862 µm]; a length of the reflective plane of any reflector (110*a*) is [2.876 µm, 3.515 µm]; and a distance between two adjacent reflectors (110*a*) in a length direction of the reflective plane of the reflector (110*a*) is [4.190 µm, 5.122 µm].

7. The back light unit structure of claim 1, wherein the second substrate (200) further comprises a first black matrix (230);

the first black matrix (230) is located at a side of the light selection layer (220) near the reflective structure (110), and the first black matrix (230) corresponds to a plurality of reflectors (110*a*).

8. The back light unit structure of claim 1, wherein the first liquid crystal cell substrate (100*a*) further comprises a second black matrix (140);

the second black matrix (140) is located between the first conductive layer (120) and the reflective structure (110);

or, the second black matrix (140) is located at a side of the first conductive layer (120) near the liquid crystal layer (400), and the plurality of reflectors (110*a*) of the reflective structure (110) are embedded in the second black matrix (140).

9. A display panel, comprising the back light unit structure of claim 1.

10. A display apparatus, comprising the back light unit structure of claim 1.

11. A display apparatus, comprising the display panel of claim 9.

* * * * *

UNITED STATES PATENT AND TRADEMARK OFFICE
CERTIFICATE OF CORRECTION

| | | |
|---|---|---|
| PATENT NO. | : 12,066,711 B2 | Page 1 of 1 |
| APPLICATION NO. | : 17/430713 | |
| DATED | : August 20, 2024 | |
| INVENTOR(S) | : Qian Wang, Wenqing Zhao and Qingxun Zhang | |

It is certified that error appears in the above-identified patent and that said Letters Patent is hereby corrected as shown below:

On the Title Page

Item (54) and in the Specification, Column 1, Lines 1-2, The title should be as shown below:
Back Light Unit Structure of Liquid Crystal Display, Liquid Crystal Display Panel and Liquid Crystal Display Apparatus Signed and Sealed this
Twenty-fourth Day of September, 2024

Katherine Kelly Vidal
*Director of the United States Patent and Trademark Office*